United States Patent Office 3,126,636
Patented Mar. 31, 1964

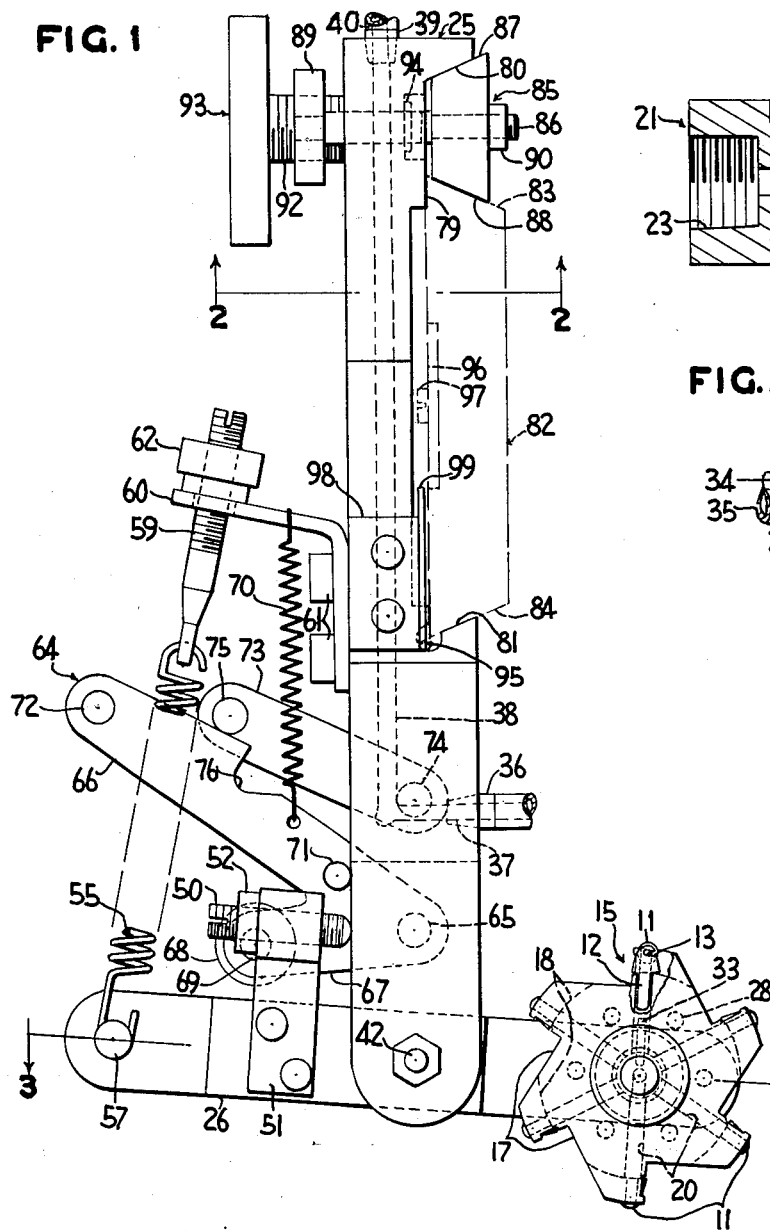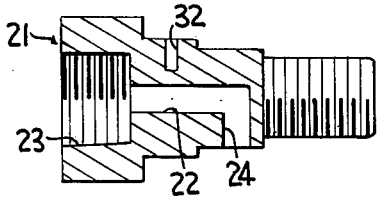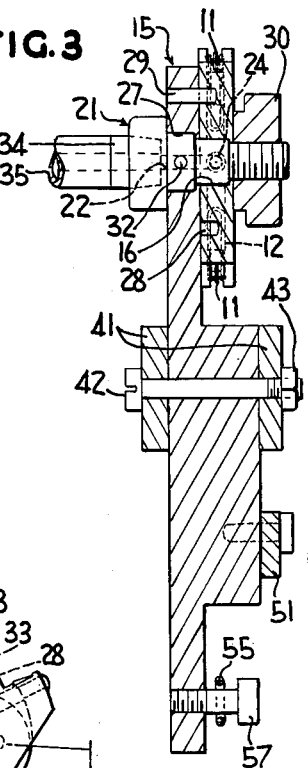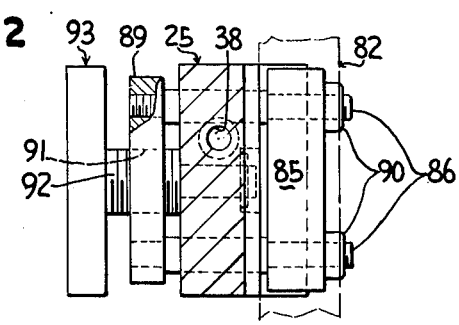

3,126,636
GLASS CUTTER ASSEMBLY
Jay J. Brand, Whitehall, Pa., assignor to Pittsburgh Plate
Glass Company, Pittsburgh, Pa., a corporation of
Pennsylvania
Filed July 26, 1960, Ser. No. 45,423
13 Claims. (Cl. 33—32)

This invention relates to a glass cutter assembly and especially relates to a glass cutter assembly including cutter wheels mounted on a turret holder and means to introduce lubricating fluid to that cutter wheel which is indexed at the scoring position.

It is well known to use a turret holder for mounting cutter wheels so that by the rotation of the turret holder a worn cutter wheel can be rapidly moved from the scoring position and another cutter wheel moved to the scoring position. When using a cutter wheel to score a glass sheet it is customary to feed a lubricating fluid, such as kerosene, to the glass sheet immediately ahead of the contact of the cutter wheel with the glass sheet. A conventional device for transmitting the lubricating fluid includes a felt to which the fluid is fed. The use of the conventional device results in the feeding of an excessive amount of lubricating fluid to the glass sheet in order to insure that during the subsequent contact between the cutter wheel and the glass sheet the fluid is present.

It is an object of the present invention to provide a glass cutter assembly including cutter wheels mounted on a turret holder that is rotatable between positions at which it can be indexed so that at each position a different cutter wheel is placed in scoring position while at the same time providing a construction by which a lubricating fluid is fed only to the cutter wheel indexed at the scoring position.

This and other objects of the present invention will be apparent to one skilled in the art from the description which follows of the preferred embodiment of the glass cutter assembly of this invention taken in conjunction with the drawings in which similar parts are designated by the same numeral and in which:

FIG. 1 is an elevation, partially broken away, of the preferred embodiment of the glass cutter assembly;

FIG. 2 is a cross section taken along line 2—2 of FIG. 1;

FIG. 3 is a cross section taken along line 3—3 of FIG. 1; and

FIG. 4 is a longitudinal section of the pin used to rotatably mount the turret holder of the glass cutter assembly.

In accordance with the present invention the glass cutter assembly includes glass cutter wheels rotatably mounted on the peripheral portion of a turret holder so that the axes of rotation of the cutter wheels are parallel and the wheels extend beyond the periphery of the holder. The turret holder is rotatably mounted on a support, which includes a pin that is mounted in a manner to prevent its rotation. The pin has a longitudinal orifice or bore extending only from one end. The longitudinal orifice or bore is preferably an axial bore. The pin also has a radial bore communicating with the longitudinal bore intermediate the ends of the pin. The turret holder for the cutter wheels has a central aperture and radial bores communicating with the central aperture. The cutter wheels are mounted on the turret holder so that the axis of each cutter wheel is substantially coincident with the longitudinal axis of one of the radial bores. The glass cutter assembly of the present invention also includes means mounted on the support to index the turret cutter at any one of several positions. At each of these positions one of the cutter wheels is placed at the scoring position. The indexing means prevents rotation of the turret holder when the latter is held against the indexing means by means that prevents axial displacement of the turret holder.

The glass cutter assembly of this invention, as exemplified by the preferred embodiment shown in the figures of the drawing, comprises glass cutter wheels 11. For each cutter wheel 11 there is provided a U-shaped clip 12 having a notch 13 in each of the two flanges or legs adjacent their free end. The axle of wheel 11 is in these notches of clip 12 for free rotation. Each clip 12 has its flanges wider at their free ends than the rest of the flanges for the reason described later.

A turret holder generally indicated at 15 has a central cylindrical aperture 16. The turret holder 15 is essentially a circular disc except for a number of peripheral notches 17 which correspond in number to the number of cutter wheels 11 rotatably supported by turret holder 15. The holder 15 has peripheral arcuate grooves 18 which have a common center of curvature coincident with the axis of aperture 16. Each peripheral groove 18 extends between adjacent notches 17. In the preferred embodiment each notch 17 is right-angled with one wall parallel to the axis of an adjacent radial bore 20. The turret holder 15 has radial bores 20 communicating central aperture 16 with the grooved periphery of holder 15. The number of bores 20 corresponds to the number of cutter wheels 11 mounted on turret holder 15. Each peripheral groove 18 between adjacent notches 17 has a depth such that its bottom is farther from aperture 16 than the juncture of the two faces of each notch 17. The narrow end portion of each clip 12 is in one of the bores 20. The wider end portion of clip 12 with a cutter wheel 11 mounted on it and with the axle of wheel 11 in the pair of notches 13 cannot fit in bore 20 but is in groove 18 with the flanges of clip 12 abutting the sidewalls of groove 18 so that clip 12 cannot fall out. The face of notch 17 that is parallel to the adjacent radial bore is recessed so that the wider ends of the arms of clip 12 extend beyond this face of notch 17. This facilitates ready removal of clip 12 and its associated cutter wheel 11.

The turret holder 15 is mounted on a pin generally indicated at 21 which is enlarged at one end and is threaded at the other end. The pin 21 has an axial bore 22 extending only from one end, e.g., the enlarged end. The bore 22 has a threaded portion 23 of larger diameter at its open end. The pin 21 has a radial bore 24 communicating with bore 22 intermediate the ends of pin 21. The turret holder 15 is mounted on pin 21 so that radial bore 24 of pin 21 is in the plane containing radial bores 20 of turret holder 15.

The support for pin 21 includes a bar generally indicated at 25 which is in a vertical position during the use of the glass cutter assembly for the scoring of a glass sheet having its surface to be scored disposed in a horizontal position. The bar 25 pivotally supports an arm 26 intermediate the ends of the latter. The arm 26 has a horizontal aperture 27 at one end. The pin 21 extends through aperture 27 with its enlarged end and its threaded end on opposite sides of arm 26. The radial bore 24 is on the same side of arm 26 as the threaded end of pin 21. The turret holder 15 is mounted on pin 21 as described above so that bore 24 can be in alignment with any radial bore 20 of turret holder 15 merely by rotation of the latter.

The turret holder 15 has a number of circular holes 28 which are equidistant from the axis of central aperture 16. A cylindrical pin 29 is mounted on arm 26 to extend in the same direction that the threaded end of pin 21 extends from arm 26. The pin 29 is mounted on arm 26 so that its axis is the same distance from the central axis of aperture 16 or pin 21 as that between the axis of aperture 16 and central axis of each hole 28. As a result, when turret holder 15 is rotated on pin 21, its holes 28 are presented in sequence in alignment with pin 29. When one of holes 28 is in alignment with pin 29, turret holder 15 can be moved into abutment with arm 26. The rotation of turret holder 15 is then prevented so long as movement of turret holder 15 axially of pin 21 is prevented. A nut 30 is mounted on the threaded end of pin 21 to prevent this axial movement when nut 30 abuts turret holder 15. In order to index turret holder 15 to another position to present one of the other cutter wheels 11 to scoring position, nut 30 is rotated for sufficient movement so that turret holder 15 can be moved away from arm 26 until pin 29 is no longer in one of holes 28. The turret holder 15 is rotated to present another cutter wheel 11 at the scoring position and then turret holder 15 is moved toward arm 26 and pin 29 engages hole 28 now in alignment with it. The nut 30 is retightened.

The arm 26 has an aperture extending from its top surface radially of aperture 16 and communicating with aperture 16. The pin 21 has a radial orifice 32 positioned so that when pin 21 is mounted on arm 26 a pin 33 inserted in the aperture extending downwardly from the top surface of arm 26 is partially in orifice 32. The pin 33 when thus disposed prevents rotation of pin 21. As a result, bore 24 extends downwardly from bore 22 in alignment and communication with the bore 20. Bore 20 contains the narrow end portion of clip 12 while the wider, free end portion of clip 12 rotatably mounts the cutter wheel 11 that is in scoring position.

A check-valved coupling 34 is threadedly engaging pin 21 at enlarged bore portion 23 of bore 22. A hose 35 is connected to coupling 34. The hose 35 is connected to a source of lubricating fluid and in the preferred embodiment, which is being described, this connection to the fluid source is provided by means of coupling 36 mounted on bar 25 in communication with a horizontal bore 37 which extends from one face of bar 25. The horizontal bore 37 is in communication with a vertical longitudinal bore 38 in bar 25. The bore 38 is open only at the top end of bar 25 and is threaded at the top to receive a coupling 39 which is connected to a tube 40 that communicates with the fluid source.

The bar 25 has a bifurcated lower portion to provide a pair of arms 41. The intermediate portion of arm 26 is thicker than the end portions and extends between arms 41. The arm 26 is pivotally mounted in this position by a bolt 42, which is threaded only at the end of its shank, and a nut 43 although other conventional pivotal support may be provided, such as a pin mounted by bearings in arms 41.

The pivotal movement of arm 26 in one direction to move turret holder 15 downwardly is adjustably limited by a screw 50 mounted on a bracket 51 bolted on arm 26 on the side of bar 25 opposite to that of turret holder 15. The bracket 51 has a threaded bore to receive screw 50. The screw 50 is rotated to move it toward or away from one of arms 41 and its position after adjustment is fixed by tightening a nut 52 mounted on screw 50.

This pivotal movement of arm 26 to urge turret holder 15 downwardly until the movement is stopped by screw 50 abutting one of arms 41 is provided by a spring 55 having one of its hooked ends extending around a cap screw 57 threaded into the end of arm 26 opposite to the end which supports turret holder 15 by pin 21. The other hooked end of spring 55 extends through a hole in the top end of a bolt 59 which extends upwardly through a bracket 60 mounted on bar 25 by nuts 61. An adjusting knob or nut 62 is threaded on bolt 59. The adjustment of position of bolt 59 by nut 62 determines the downward force applied to wheel 11 by spring 55.

A cancelling lever generally indicated at 64 is pivotally mounted on one of arms 41 of bar 25 by a pin 65. The lever 64 has arms 66 and 67. The shorter arm 67 has a bearing 68 mounted on it by a pin 69 so that the axis of rotation of the outer race of bearing 68 is horizontal to afford rolling contact between arm 26 and bearing 68 when lever 64 is pivoted counterclockwise (as viewed in FIG. 1) as described below. The lever 64 is pivotally urged in a clockwise direction (as viewed in FIG. 1), so as to urge arms 66 and 67 upwardly, by a spring 70 connected by its hooked ends through apertures in arm 66 and bracket 60. The lever 64 has mounted on it a pin 71 which abuts one of arms 41 when lever 64 is at its raised position shown in FIG. 1. The pin 71 thus limits upward pivotal movement of lever 64. The end portion of arm 66 has mounted on it a horizontally extending pin 72 which serves as a handle for an operator to grasp for the downward pivotal movement of lever 64.

A lever 73 is also pivotally mounted on bar 25 by a pin 74 for movement about a horizontal axis. The lever 73 has a pin 75 mounted on its free end. The pin 75 is abutted by the top surface of arm 66 of lever 64 which prevents downward movement due to gravity of lever 73. The arm 66 has a notch 76 in its top surface to be engaged by pin 75 mounted on lever 73 when arm 66 is moved downwardly by an operator. Thus lever 73 and pin 75 lock lever 64 in latching position whenever lever 64 is moved downwardly. This results in the raising of turret holder 15 so that the downward movement of bar 25 does not move the lowest cutter wheel 11 into scoring position. Thus one or more of the cutter assemblies of the present invention, as illustrated by the preferred embodiment, can be rendered ineffective for scoring by the latching of lever 64 through the placement of pin 75 on lever 73 in notch 76 so that bearing 68 has pivoted arm 26 to raise turret holder 15. To unlatch lever 64 an operator grasps pin 72 to lower arm 65 and then raises lever 73. The operator maintains lever 73 in the raised position while raising lever 64. This results in pin 75 engaging the top surface of an arm 65 outwardly of notch 76 so that lever 64 is in the position indicated in FIG. 1 whereby bearing 68 is spaced above arm 26.

In the illustrative embodiment the bar 25 has one side with a horizontal wide groove 79 having top and bottom sidewalls 80 and 81 which are parallel to each other and which are inclined with respect to horizontal and vertical planes. The base of the wide groove having side-walls 80 and 81 is vertical and is placed in abutment with the vertical front face of a support rail generally indicated at 82 shown in phantom in FIGS. 1 and 2. Of course, only a portion of rail 82 is shown in FIG. 2. The top and bottom surfaces 83 and 84 of support rail 82 are inclined with their planes converging rearwardly of rail 82. The bottom inclined surface 84 is parallel to the bottom sidewall 81 of wide groove 79 in one side of bar 25. A wedge clamp generally indicated at 85 is mounted on a pair of shafts 86 extending through apertures in clamp 85. The clamp 85 has top and bottom inclined surfaces 87 and 88 which are in planes converging in a direction opposite to that of converging of the planes for the top and bottom inclined surfaces 83 and 84 of rail 82. With shafts 86 horizontal the top surface 87 of clamp 85 is parallel with top sidewall 80 of wide groove 79 in one side of bar 25 and the bottom inclined surface 88 of clamp 85 is parallel to the top inclined surface 83 of support rail 82. Thus movement of wedge clamp 85 to the left (as viewed in FIG. 1) results in the movement of bar 25 to the right and upwardly to bring it into tight engagement with the front and bottom faces of support rail 82.

The shafts 86 are mounted on a plate 89 to extend in parallel relationship with each other. The free ends of shafts 86 have a smaller diameter to provide a shoulder. These smaller diameter ends of shafts 86 extend through clamp 85 and the latter is held in abutment with these shoulders of shafts 86 by nuts 90 mounted on the threaded ends of shafts 86. The plate 89 has a threaded central aperture 91 through which extends a shank 92 of a bolt generally indicated at 93. The end portion of shank 92 is not threaded and it has a smaller diameter than the balance of shank 92 which is threaded. The end portion has an annular groove adjacent the end. The groove is located to receive a retaining ring 94 so that the latter abuts the shoulder in the countersunk end of the aperture in bar 25 through which shank 92 extends. With this construction axial movement of bolt 93 is prevented during the rotation of bolt 93 which results in the movement of plate 89 toward or away from bar 25.

The juncture between bottom sidewall 81 of wide groove 79 in one side of bar 25 and the vertical base of that groove is provided with a groove 95 having a cylindrical curvature into which the portion of support rail 82 at the juncture of its front face and bottom inclined face 84. This construction is provided merely to reduce a binding action.

The front face of support rail 82 has a longitudinal groove on which an indicia plate 96 is placed. The indicia plate 96 has markings to indicate lengths from a reference point. The plate 96 is mounted on rail 82 by screws 97. A part of the base of wide groove 79 of bar 25 is slotted opposite longitudinal indicia plate 96 so that there is clearance between screws 96 and bar 25.

On another side of bar 25 is mounted a bracket 98 which has a pointer 99 that includes a vertical line which is used with the markings on plate 95 to read the distance of the vertical plane containing cutter wheels 11 on turret holder 15 from a reference point.

The preferred embodiment of the glass cutter assembly of this invention has been described above but many of the specific limitations of construction of the preferred embodiment are not limitations of the invention. In its broadest aspect, for example, the use of pivotal arm 26 with bar 25 to cooperate with pin 21 for the support of turret holder 15 is not necessary. The turret holder 15 can be rotatably mounted on pin 21 which can be supported directly by bar 25 or other similar support. Furthermore, the support can have a circular boss in lieu of pin 21 and the boss can have a longitudinal bore such as bore 22 in pin 21. In this case the longitudinal bore would extend from the boss through the integral base part of the support.

In its broadest aspect the mounting of the support for the turret holder on a rail and the use of a wedge as described above and as shown in the drawings are not necessary. The use of a support rail that can be moved up and down is not part of this broadest aspect of the invention. Similarly, the latching and unlatching mechanism that is shown for use with pivotal arm 26 and the spring which urges arm 26 so that turret holder 15 is urged downwardly form no part of the broadest aspect of the present invention.

When using a pivotal arm as part of the overall support for turret holder, various other constructions can be utilized to provide the lowering of turret holder 15 when this is desired. One of these constructions is described and claimed in my copending application Serial No. 11,-261, filed on February 26, 1960, and entitled "Glass Cutting Apparatus." It will be apparent to one skilled in the art that the glass cutter assembly of that copending application can be suitably modified to incorporate the present invention.

The preferred embodiment shows a construction for introducing lubricating fluid into bore 22. This construction includes vertical bore 38 and communicating horizontal bore 37 which are in bar 25. It will be apparent to one skilled in the art that the tubing 40 can be connected directly to a lubricating fluid source which may be mounted on a bar 25 or which may be mounted elsewhere.

The specific manner of rotatably mounting cutter wheels 11 in turret holder 15 is merely illustrative for the preferred embodiment. Various other details are obviously merely illustrative of the preferred manner of construction of the cutter assembly.

In the preferred embodiment bores 20 are radial bores whereas it will be apparent to one skilled in the art that one or more of these may be arcuate or tortuous so long as the bores can communicate in succession the vicinity of each cutter wheel 11 with bore 24 of pin 21 when turret holder 15 is indexed at the several positions. Similarly, bore 24 may be other than radial so long as its outer end is located with respect to the inner ends of bores 20 to provide communication with one of these at each of the indexing positions of turret holder 15.

In the preferred embodiment the coupling 34 has been described as containing a check valve which is set so that it will require a slight pressure, e.g., 5 p.s.i., to open the valve. The pressure from the oil source through hose 35 is provided such that it is slightly above the opening pressure of the check valve. As a result, the valve will restrict flow to an intermittent operation so that essentially a drop at a time is introduced into bore 20 through bores 22 and 24. This prevents overflow of lubricating fluid to the glass sheet at the area of cutting wheel 11 which is in the scoring position. When one of the glass cutter assemblies of the present invention is rendered inoperative, e.g., by the latching of lever 64 in the down position, as described above, the fluid feed to tube 40 can be shut off by a valve so that the check valve in coupling 34 prevents further flow to turret holder 15.

Various other modifications of the present invention will be apparent to one skilled in the art from the foregoing description of the preferred embodiment which has been presented merely for purpose of illustration. The invention is limited only by the claims which follow.

I claim:

1. A glass cutter assembly comprising a support including a cylindrical pin having a longitudinal bore open only at one end and a bore communicating the longitudinal bore with the cylindrical surface of said pin, a turret holder having a central aperture and a peripheral portion and rotatably mounted on said pin in the central aperture, said turret holder having bores extending from said central aperture to said peripheral portion, glass cutter wheels mounted on support means for free rotation, said support means having a portion thereof located within said last named bores with the axes of rotation of said cutter wheels being parallel and with said cutter wheels extending beyond the periphery of said means to index said turret holder at several positions of its rotation whereby at each position one of the bores extending from the central aperture communicates with the bore in said pin communicating with the longitudinal bore for the introduction of lubricating fluid through the longitudinal bore of said pin directly to one of said cutter wheels.

2. A glass cutter assembly comprising a support including a cylindrical pin having a longitudinal bore open only at one end and a radial bore communicating with the longitudinal bore, a turret holder having a central aperture and peripheral portions and rotatably mounted on said pin in the central aperture, said turret holder having radial bores extending from said central aperture to said peripheral portions, said turret holder having peripheral grooves having a common center of curvature, glass cutter wheels rotatably mounted between the free ends of a U-shaped clip, said clip inserted directly into said radial bore with its free ends abutting the side walls of said groove with the axes of rotation of said cutter wheels being parallel and with said cutter wheels extending beyond the periphery of said turret holder, means to index said turret holder at several positions of its rotation whereby at each position one of the bores extending from the central aperture communicates with the radial bore in said pin for the introduction of lubricating fluid through the longitudinal bore of said pin directly to one of said cutter wheels.

3. The glass cutter assembly of claim 2 and further including means to prevent movement of said turret cutter axially of said pin during operation of said indexing means to maintain communication between the radial bore in said pin and one of the radial bores in said turret holder.

4. The glass cutter assembly of claim 2 and further including means to prevent movement of said cylindrical pin about its longitudinal axis to maintain the radial bore in said pin in a downwardly extending direction away from the longitudinal bore of said pin.

5. A glass cutter assembly comprising a support including a vertical bar, an arm pivotally mounted on said bar intermediate the ends of said arm and having a horizontal aperture at one end of said arm and a pin mounted on said arm and extending through the aperture at the end, said pin having a longitudinal bore open only at one end and a bore communicating the longitudinal bore with the cylindrical surface of said pin intermediate the ends of said pin and on one side of said bar, a turret holder having a central aperture and rotatably mounted on said pin in the central aperture, glass cutter wheels rotatably mounted on peripheral portions of said turret holder with the axes of rotation of said cutter wheels being parallel and with said cutter wheels extending beyond the periphery of said turret holder, said turret holder having radial bores extending from the central aperture to the peripheral portions rotatably supporting said glass cutter wheels, said cutter wheels being mounted on support means for free rotation, said support means having a portion thereof located within said radial bores, means to index said turret holder at several positions of its rotation whereby at each position one of the bores extending from the central aperture communicates with the radial bore in said pin for the introduction of lubricating fluid through the longitudinal bore of said pin directly to one of said cutter wheels.

6. The glass cutter assembly of claim 5 wherein the longitudinal bore in said pin is an axial bore and wherein the bore communicating the longitudinal bore with the cylindrical surface of said pin is a radial bore.

7. The glass cutter assembly of claim 5 and further including means to prevent rotation of said pin about its axis.

8. The glass cutter assembly of claim 7 wherein said pin has a radial orifice and wherein the means to prevent rotation of said pin includes a pin extending downwardly through the top surface of said arm into said orifice.

9. The glass cutter assembly of claim 5 wherein said turret holder has circular holes parallel to and equidistant from the axis of the central aperture of said turret holder and wherein the indexing means includes an indexing pin mounted on said arm for movement into one of the circular holes during axial movement of said turret holder when one of the circular holes is in alignment with said indexing pin.

10. The glass cutter assembly of claim 9 and wherein the pin rotatably mounting said turret holder has a radial orifice and said arm has a hole in communication with said orifice and extending upwardly to the top surface of said arm and said glass cutter assembly further includes a pin in said hole in said arm and in the radial orifice of said pin rotatably mounting said turret holder.

11. The glass cutter assembly of claim 10 wherein said pin rotatably mounting said turret holder is threaded at one end opposite to the longitudinal bore and open at the other end and wherein said assembly includes a nut mounted on the threaded end of said pin to prevent axial movement of said turret holder.

12. The turret cutter assembly of claim 5 and further including a check-valved coupling mounted on said pin at the open end of the longitudinal bore and a hose connected to said coupling for connection to a lubricating fluid source.

13. A glass cutter assembly comprising a support including a vertical bar, an arm pivotally mounted on said bar intermediate its ends and having a horizontal aperture at one of its ends, a cylindrical pin mounted extending through said aperture, said pin having a longitudinal bore open only at one end and a second bore communicating the longitudinal bore with the cylindrical surface of said pin intermediate the ends of said pin and on one side of said bar, a turret holder having a central aperture and rotatably mounted on said pin, said turret holder being essentially a circular disk having a plurality of peripheral notches, said turret holder having peripheral grooves having a common center of curvature, each of said grooves extending between adjacent ones of said notches, glass cutter wheels rotatably mounted on peripheral portions of said turret holder with their axes of rotation parallel, said cutter wheels extending beyond periphery of said turret holder, said turret holder also having radial bores extending from said central aperture to the peripheral portions rotatably supporting said glass cutter wheels, said cutter wheels being mounted on support means for free rotation, said support means having a portion thereof located within said radial bores, means to index said turret holder from one position to another position whereby at each position one of the bores extending from the central aperture communicates with the radial bore in said pin for the introduction of lubricating fluid through the longitudinal bore of said pin directly onto one of said cutter wheels.

References Cited in the file of this patent

UNITED STATES PATENTS

| | | |
|---|---|---|
| 1,702,522 | Owen | Feb. 19, 1929 |
| 2,091,332 | Owen | Aug. 31, 1937 |
| 2,473,138 | Darash | June 14, 1949 |